US008776385B2

(12) United States Patent
Huang (10) Patent No.: US 8,776,385 B2
(45) Date of Patent: Jul. 15, 2014

(54) BLADE ADAPTER AND HACKSAW EQUIPPED WITH THE BLADE ADAPTER

(76) Inventor: Yin Han Huang, Taichung (TW)

(*) Notice: Subject to any disclaimer, the term of this patent is extended or adjusted under 35 U.S.C. 154(b) by 140 days.

(21) Appl. No.: 13/371,428

(22) Filed: Feb. 11, 2012

(65) Prior Publication Data

US 2013/0205605 A1  Aug. 15, 2013

(51) Int. Cl.
*B23D 51/03* (2006.01)
*B23D 49/12* (2006.01)
*B27B 21/02* (2006.01)

(52) U.S. Cl.
USPC .................................. 30/512; 30/506; 30/508

(58) Field of Classification Search
CPC ........ B23D 49/12; B23D 51/10; B23D 51/03; B27B 21/02
USPC ........ 30/506, 507, 508, 509, 512, 513; D8/96
See application file for complete search history.

(56) References Cited

U.S. PATENT DOCUMENTS

| | | | | |
|---|---|---|---|---|
| 1,429,195 A * | 9/1922 | Donaldson | ..................... | 30/512 |
| 2,173,365 A * | 9/1939 | Kessler | ........................... | 30/510 |
| 2,556,093 A * | 6/1951 | Leatherman | .................... | 30/513 |
| 2,612,920 A * | 10/1952 | Williams | ........................ | 30/511 |
| 2,782,821 A * | 2/1957 | Gunnerson | .................... | 30/510 |
| 4,680,863 A * | 7/1987 | Duffy | ............................. | 30/511 |
| 5,074,002 A * | 12/1991 | Huang | ............................. | 7/149 |
| 5,722,173 A * | 3/1998 | Huang | ........................... | 30/510 |
| 5,873,170 A * | 2/1999 | Stanley | ........................... | 30/519 |
| 6,070,330 A * | 6/2000 | Phelon et al. | ................... | 30/513 |
| 6,134,791 A * | 10/2000 | Huang | ........................... | 30/513 |
| 6,230,412 B1 * | 5/2001 | Lin | ................................. | 30/512 |
| 6,606,795 B2 * | 8/2003 | Erisoty et al. | ................... | 30/512 |
| D489,242 S * | 5/2004 | Snider | ............................. | D8/96 |
| 6,772,522 B1 * | 8/2004 | Huang et al. | ................... | 30/513 |
| 6,820,341 B2 * | 11/2004 | Snider | ............................ | 30/513 |
| 7,174,644 B2 * | 2/2007 | Critelli et al. | ................... | 30/512 |
| 7,617,608 B2 * | 11/2009 | Zakarian | ........................ | 30/514 |
| 2012/0011732 A1 * | 1/2012 | Ranieri et al. | .................. | 30/506 |

* cited by examiner

Primary Examiner — Hwei C Payer (57) ABSTRACT

A blade adapter for a hacksaw is connected to the spine of the hacksaw and includes three connection portions. The hacksaw blade is connected between the engaging portion connected to the handle of the hacksaw and one of the three connection portions of the blade adapter to set the hacksaw blade at two different angular positions relative to the spine. The hacksaw blade can be set to be parallel to the spine or at an angle relative to the spine. A jabsaw blade is able to be connected to the front end of the hacksaw.

7 Claims, 9 Drawing Sheets

BLADE ADAPTER AND HACKSAW EQUIPPED WITH THE BLADE ADAPTER

FIELD OF THE INVENTION

The present invention relates to a hacksaw, and more particularly, to a hacksaw blade adapter which adjusts the angle of the hacksaw blade relative to the frame of the hacksaw, and is able to be connected with a jabsaw blade.

BACKGROUND OF THE INVENTION

U.S. Pat. No. 2,658,541 discloses a typical hacksaw and U.S. Pat. No. 5,471,752 discloses a hacksaw with a means for increasing the tension of the blade. U.S. Pat. No. 7,174,644 discloses a hacksaw wherein the angle between the blade and the hacksaw frame can be adjusted, and a jabsaw blade is able to be connected to the front end of the hacksaw frame. U.S. Pat. No. 6,134,791 discloses a tension means for adjusting the tension of the hacksaw blade.

The present invention intends to provide a blade adapter for a hacksaw and the blade adapter allows the blade to be installed to the hacksaw at different angles. Furthermore, the blade adapter can be connected to a jabsaw blade at the front end of the hacksaw.

SUMMARY OF THE INVENTION

The present invention relates to a blade adapter for a hacksaw, and the blade adapter comprises a first end and a second end. An engaging portion is located at the first end of the blade adapter and an anti-slip surface is defined in the underside of the engaging portion. A first connection portion is located on the top surface of the second end of the blade adapter and has a first protrusion extending therefrom. A second connection portion extends from the bottom surface of the second end of the blade adapter and has an inclined surface. A second protrusion extends from the inclined surface. A third connection portion is located on one side of the second end of the blade adapter and a third protrusion extends from the third connection portion. The hacksaw blade is connected between the engaging portion and one of the connection portions.

The primary object of the present invention is to provide a blade adapter for a hacksaw. The blade adapter is connected to the spine of the hacksaw and includes three connection portions. The hacksaw blade is connected between the engaging portion connected to the handle of the hacksaw and one of the three connection portions of the blade adapter to set the hacksaw blade at two different angular positions relative to the spine. The hacksaw blade can be set to be parallel to the spine or at an angle relative to the spine. A jabsaw blade is able to be connected to the front end of the hacksaw.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
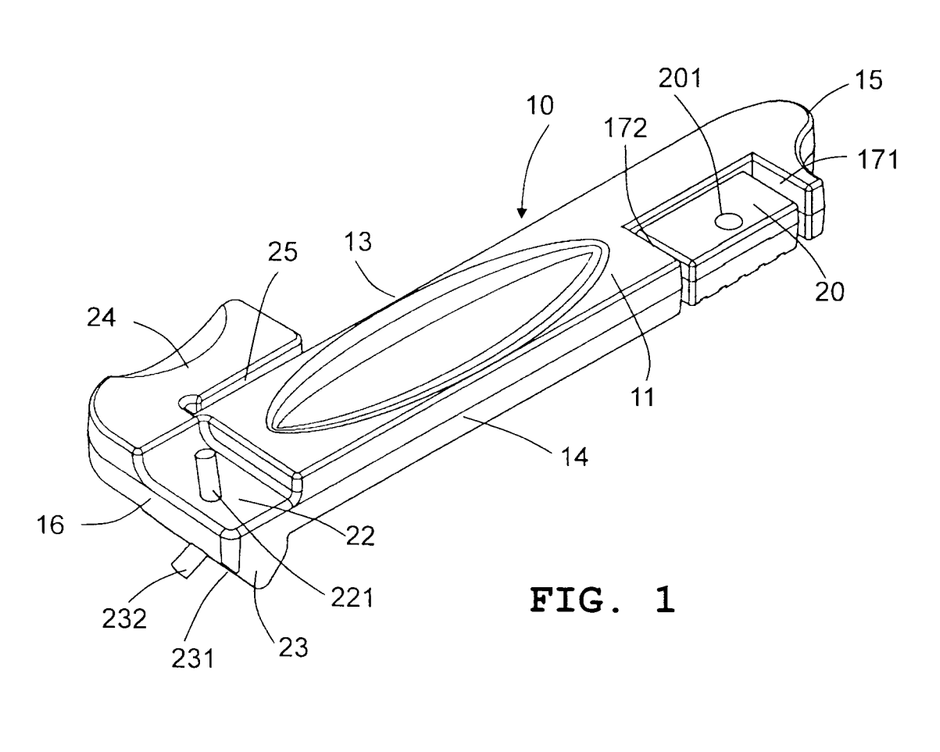
FIG. 1 is a perspective view to show the blade adapter of the present invention.
Figure 2:
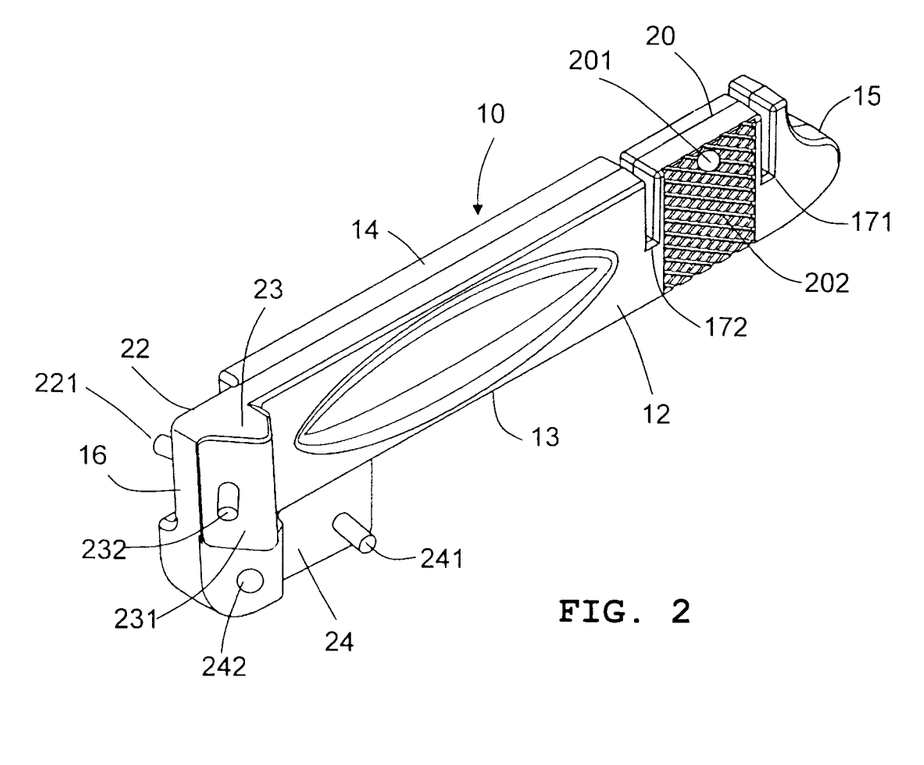
FIG. 2 is another perspective view, from the underside of the blade adapter of the present invention.

Referring to FIGS. 1 and 2, the hacksaw blade adapter 10 of the present invention is a substantially rectangular member comprises a top surface 11, a bottom surface 12, a left side 13, a right side 14, a first end 15 and a second end 16. Two openings 171, 172 are defined in the right side 14 of the blade adapter 10 and located close to the first end 15 of the blade adapter 10. An engaging portion 20 is located between the two openings 171, 172. The engaging portion 20 has a threaded hole 201 defined therethrough and an anti-slip surface 202 is defined in the underside of the engaging portion 20. A first connection portion 22 is located on the top surface 11 of the second end 16 of the blade adapter 10 and has a first protrusion 221 extending therefrom. A second connection portion 23 extends from the bottom surface 12 of the second end 16 of the blade adapter 10 and located in opposite to the first connection portion 22. The second connection portion 23 has an inclined surface 231. A second protrusion 232 extends from the inclined surface 231. The third connection portion 24 extends from the left side 13 of the second end 16 of the blade adapter 10 and bends an angle. A gap 25 is defined between the third connection portion 24 and the left side 13 of the second end 16 of the blade adapter 10. A third threaded hole 242 is defined in the third connection portion 24.

Figure 3:
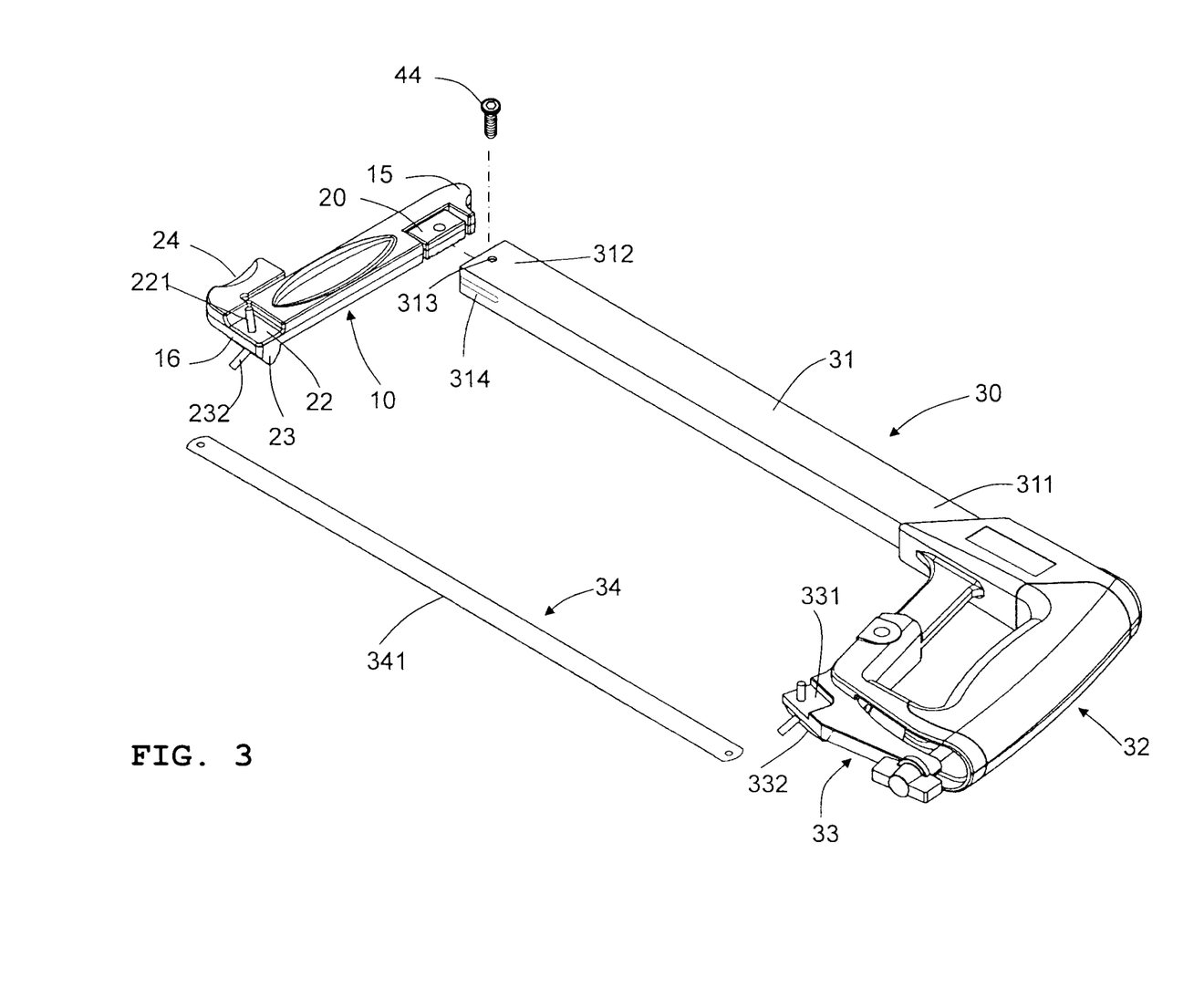
FIG. 3 is an exploded view to show that the blade adapter is connected to the hacksaw frame to set the hacksaw blade to be parallel to the spine of the hacksaw.
Figure 4:
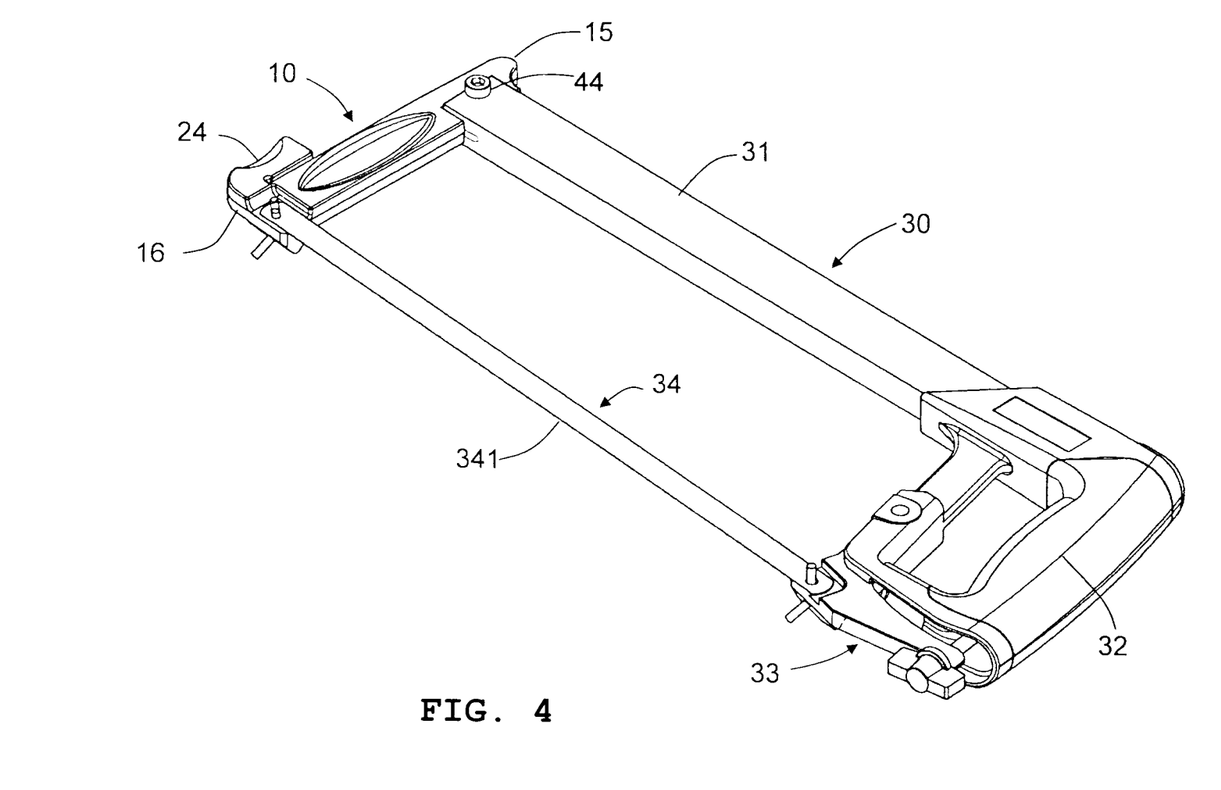
FIG. 4 is a perspective view to show combination as disclosed in FIG. 3.
Figure 5:
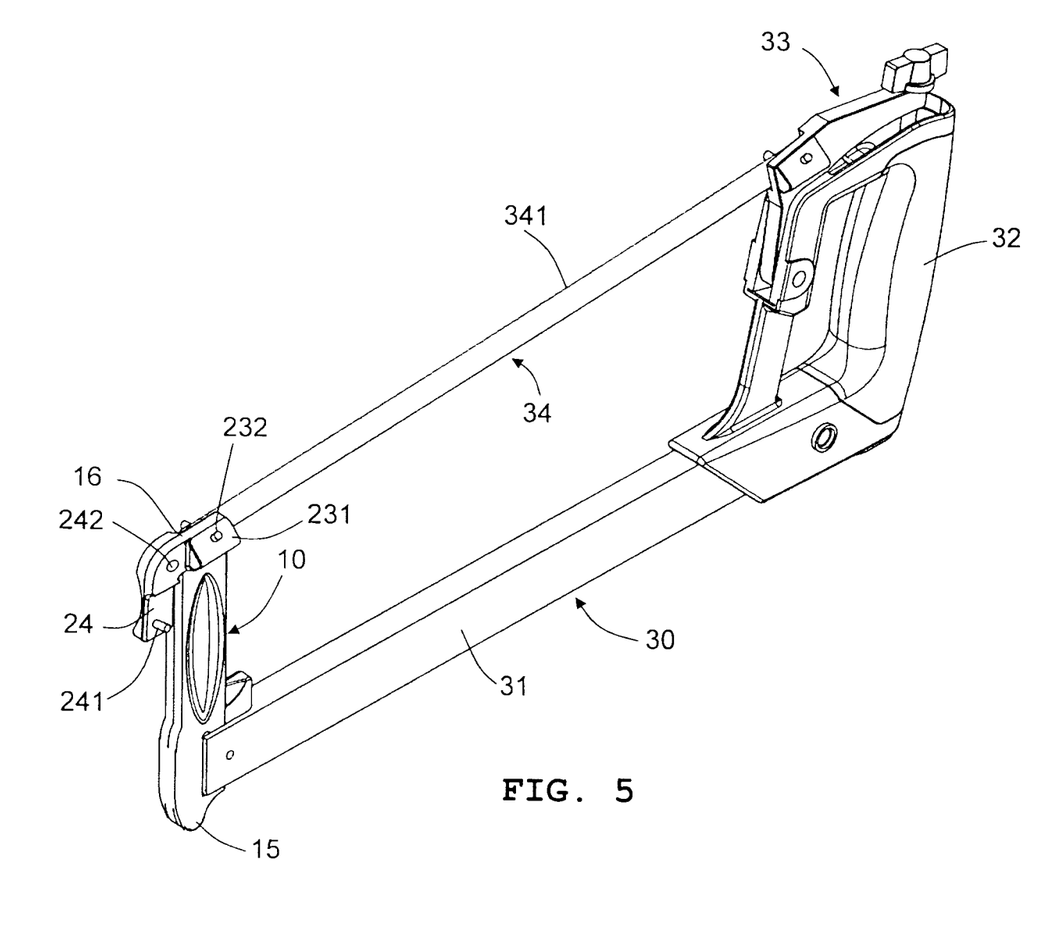
FIG. 5 is another perspective view, from the underside of the combination as disclosed in FIG. 4.

As shown in FIGS. 3 to 5, the blade adapter 10 is connected to the hacksaw 30. The hacksaw 30 includes a spine 31, a handle 32 connected to the first end 311 of the spine 31 and a tension device 33 connected to the handle 32. The tension device 33 can be any known one available in the market. The second end 312 of the spine 31 has a hollow and rectangular end to form a reception chamber. The second end 312 of the spine 31 includes a locking hole 313 defined through the wall thereof and a rib 314 is located in the reception chamber. The engaging portion 20 of the blade adapter 10 is engaged with the second end 312 of the spine 31 and the rib 314 fills in the space between the second end 312 of the spine 31 and the engaging portion 20 so that the connection between the engaging portion 20 and the second end 312 of the spine 31 is secured. A bolt 44 threadedly extends through the locking hole 313 and the threaded hole 201 to fix the engaging portion 20 in the second end 312 of the spine 31.

The blade adapter 10 extends downward from the spine 31 and a blade 34 has the first end thereof connected to the tension device 33 and the second end of the blade 34 is connected to the first protrusion 221 of the first connection portion 22 of the blade adapter 10. A frame is formed by the blade adapter 10, the spine 31 and the handle 32. The blade 34 is secured to the frame and parallel to the spine 31.

The tension device 33 provides a first surface 331 which is similar to the surface of the first connection portion 22. The cutting edge 341 of the blade 34 faces the downward direction of the hacksaw 30 as shown in FIGS. 4 and 5. Furthermore, the tension device 33 also provides a second surface 332 which is similar to the surface of the second connection portion 23. When the blade 34 is connected between the second surface 332 and the surface of the second connection portion 23, the cutting edge 341 of the blade 34 faces inclinedly relative to the hacksaw 30.

Figure 6:
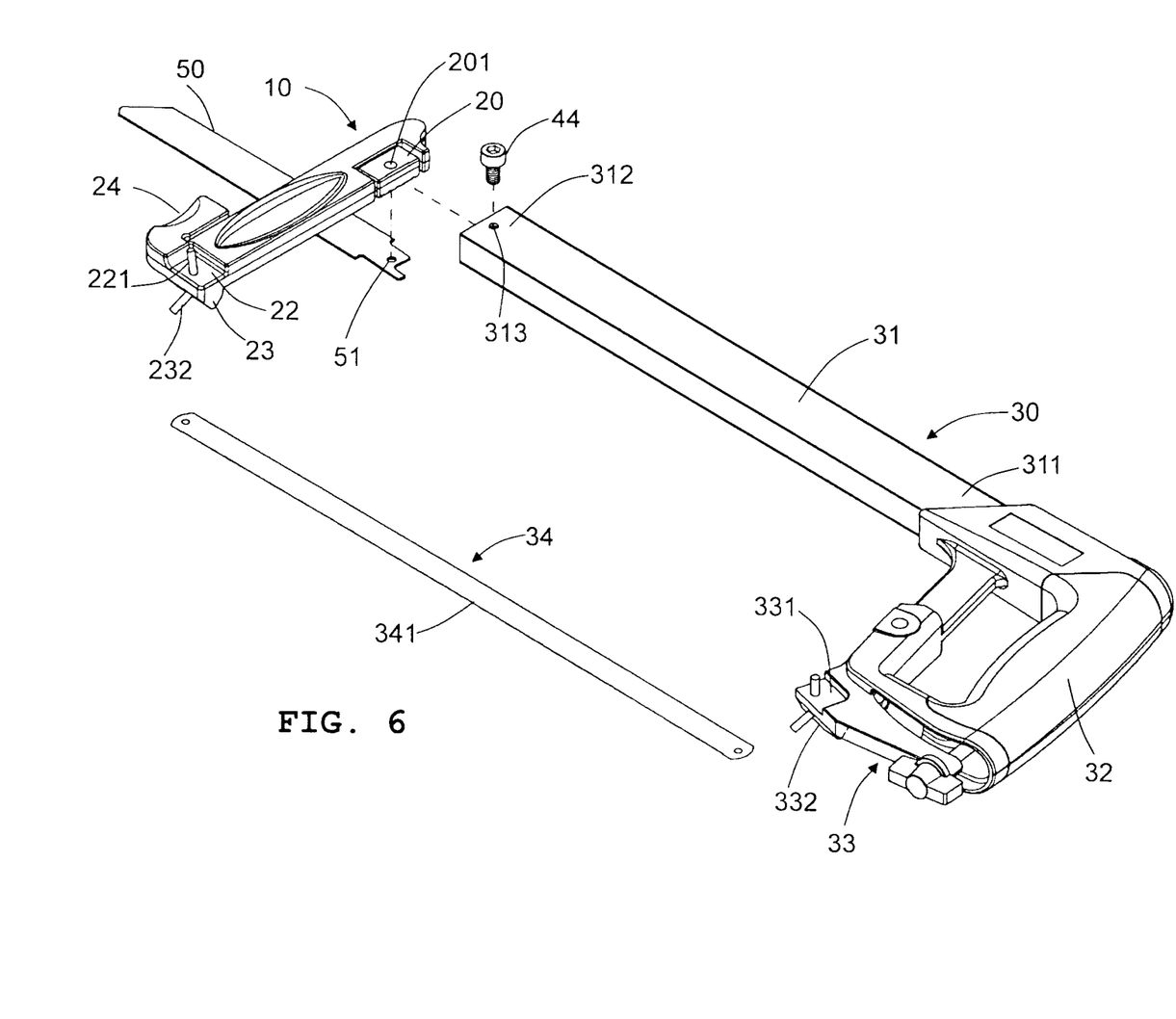
FIG. 6 is an exploded view to show that the blade adapter is connected to the hacksaw frame to set the hacksaw blade to be parallel to the spine of the hacksaw, and a jabsaw blade is to be connected to the hacksaw.
Figure 7:
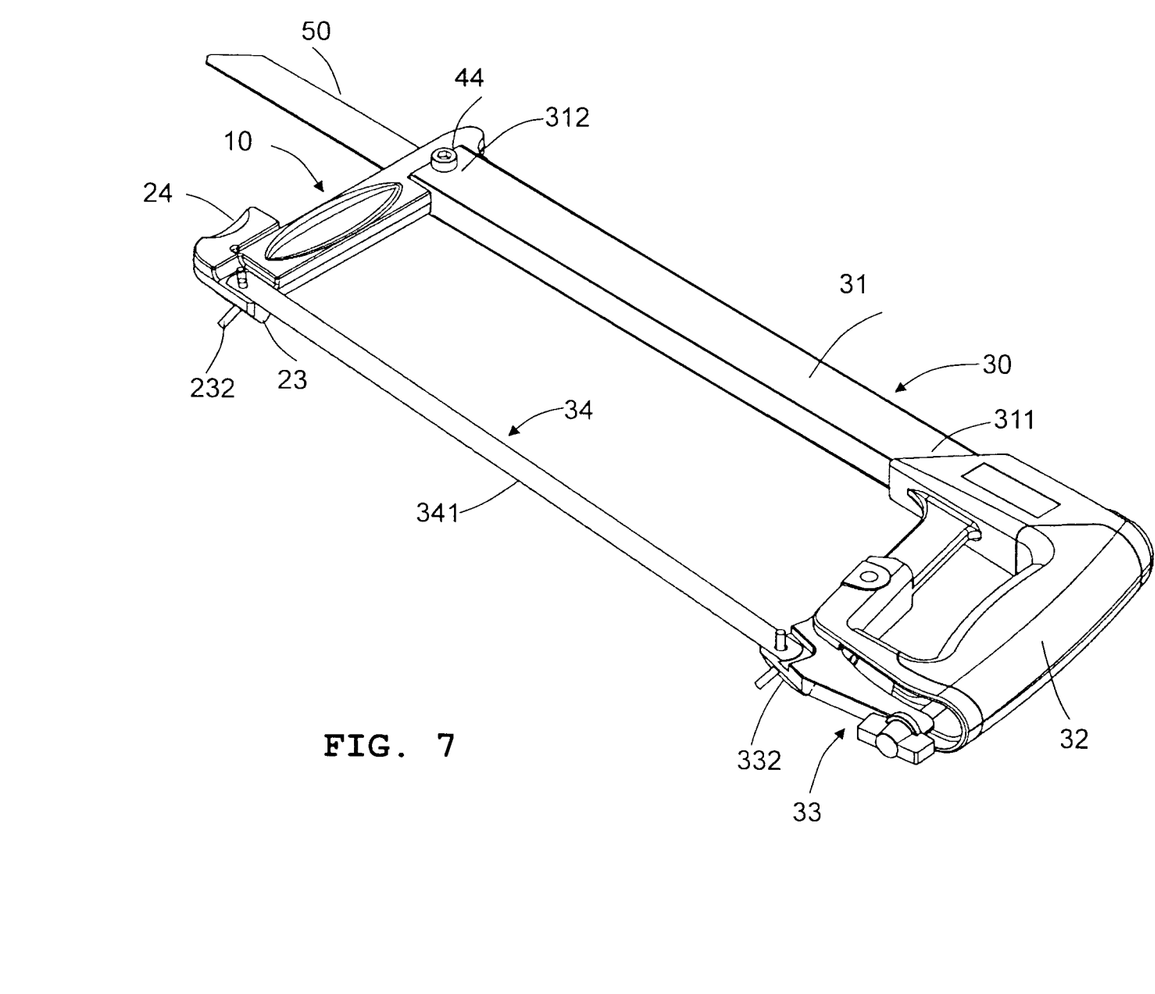
FIG. 7 is a perspective view to show combination as disclosed in FIG. 6.

As shown in FIGS. 6 and 7, a jabsaw blade 50 can be connected to the hacksaw 30 when the blade adapter 10 is installed to the hacksaw 30 as disclosed in FIGS. 3 to 5. The jabsaw blade 50 has one end thereof inserted into the space between the anti-slip surface 202 of the engaging portion 20 and the second end 312 of the spine 31, so that the jabsaw blade 50 extends from the front end of the hacksaw 30. The bolt 44 extends through the locking hole 313 of the second end 312 of the spine 31 and the threaded hole 201 of the engaging portion 20 and the positioning hole 51 of the jabsaw blade 50 to fix the jabsaw blade 50. The anti-slip surface 202 is functioned to prevent the slip of the jabsaw blade 50. Besides, when the tension device 33 adjusts the blade 34, the blade adapter 10 is also positioned. The jabsaw blade 50 is thicker and shorter than the blade 34, and the jabsaw blade 50 is cantilevered from the front end of the spine 31 so that the jabsaw blade 50 is used to cut harder objects. The jabsaw blade 50 can be stored in the inside of the spine 31 when not in use.

Figure 8:
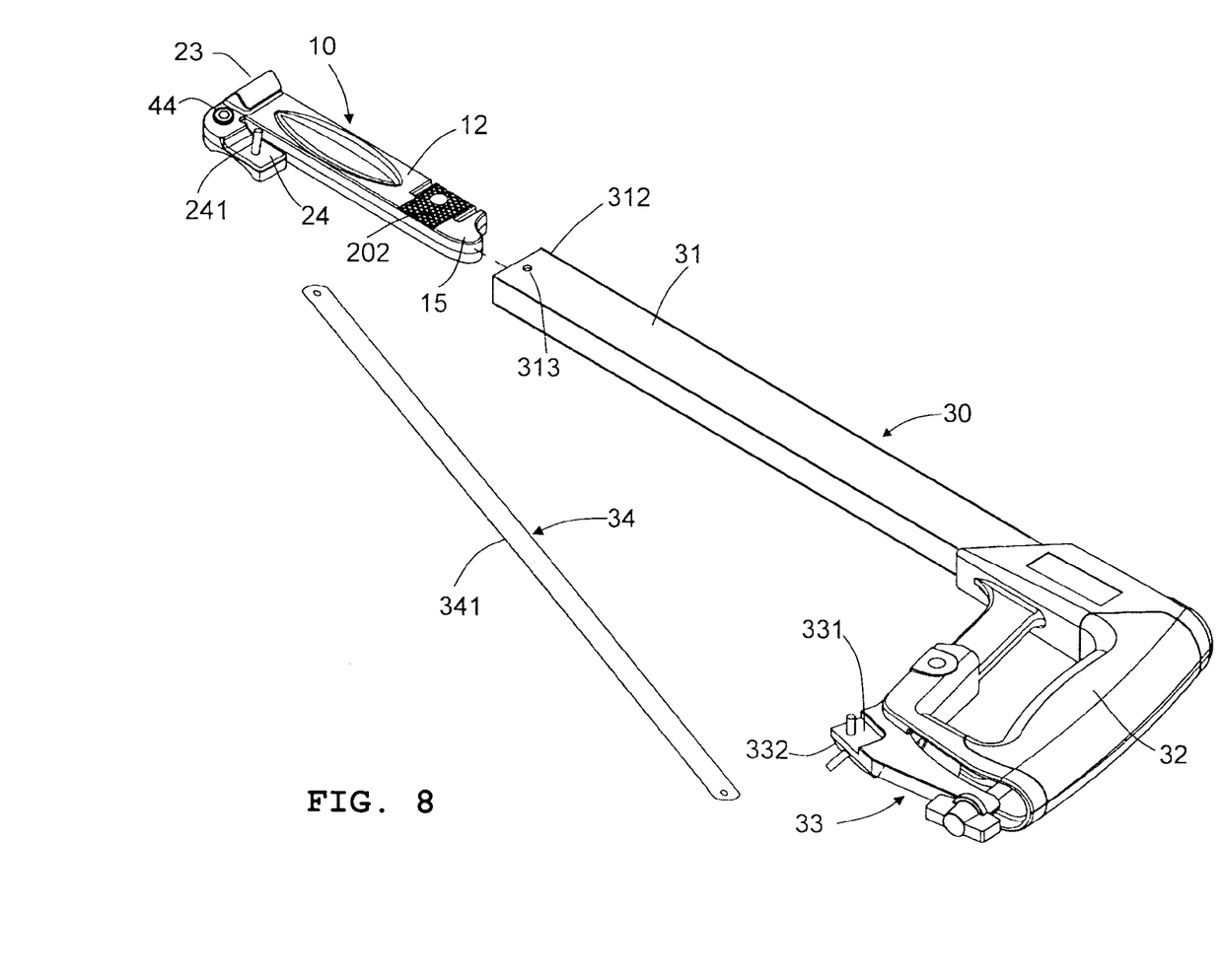
FIG. 8 is an exploded view to show that the blade adapter is connected to the hacksaw frame to set the hacksaw blade to be at angle relative to the spine of the hacksaw.
Figure 9:
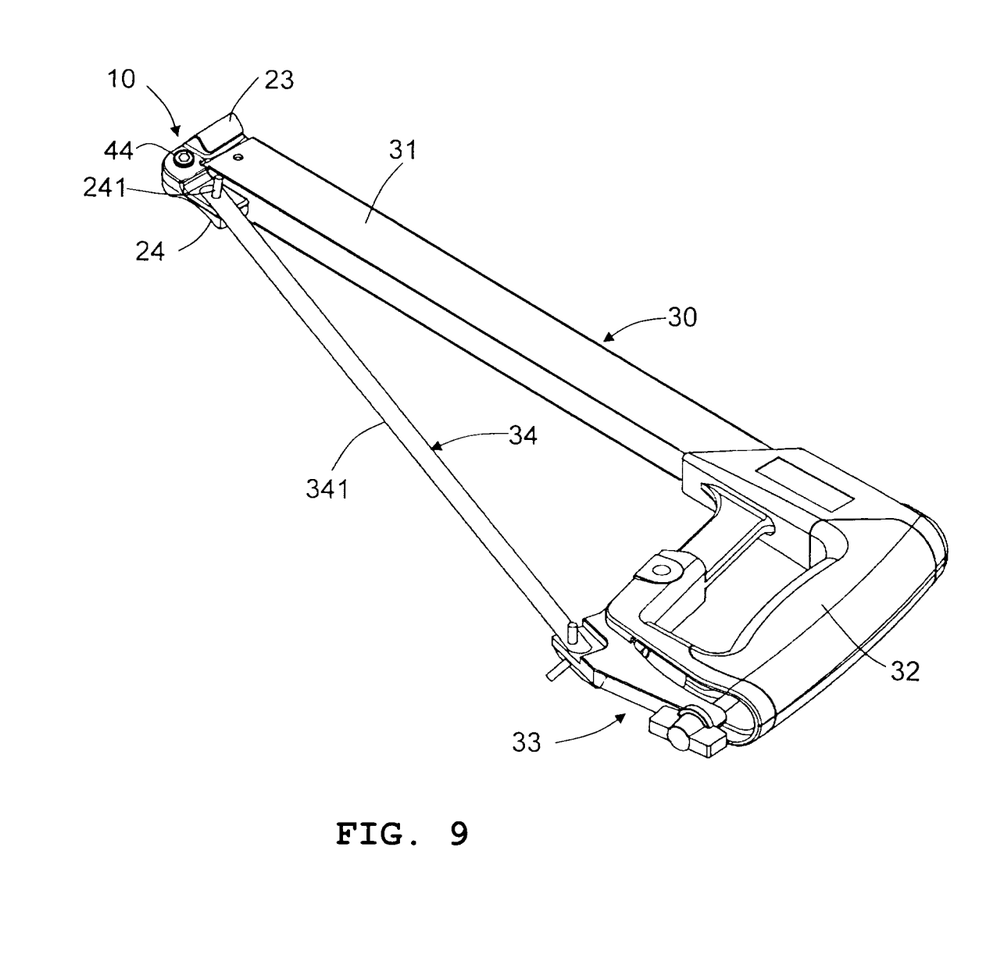
FIG. 9 is a perspective view to show combination as disclosed in FIG. 8.

As shown in FIGS. 8 and 9, the blade adapter 10 is connected to the hacksaw 30 in the second direction, wherein the first end 15 of the blade adapter 10 is inserted into the second end 312 of the spine 31 and the blade adapter 10 is accommodated in the spine 31. The second connection portion 23 is exposed from the second end 312 of the spine 31. The third connection portion 24 is located beneath the second end 312 of the spine 31. The bolt 44 is spaced from a pin 241 of the third connection portion 24. A frame is formed by the spine 31, the handle 32 and the blade adapter 10 so that the blade 34 is connected to the frame. The blade 34 is located at an angle, about 45 degrees, relative to the spine 31. This embodiment shortens the front end of the hacksaw 30 which is then can be operated in a narrow space.

While we have shown and described the embodiment in accordance with the present invention, it should be clear to those skilled in the art that further embodiments may be made without departing from the scope of the present invention.

What is claimed is:

1. A blade adapter for a hacksaw, comprising:
a first end and a second end, an engaging portion located at the first end of the blade adapter and an anti-slip surface defined in an underside of the engaging portion;
a first connection portion located on a top surface of the second end of the blade adapter and having a first protrusion extending therefrom;
a second connection portion extending from a bottom surface of the second end of the blade adapter and having an inclined surface, and a second protrusion extending from the inclined surface; and
a third connection portion located on a side of the second end of the blade adapter and a third protrusion extending from the third connection portion;
wherein two openings are defined in a side of the blade adapter and located close to the first end of the blade adapter, the engaging portion is located between the two openings.

2. The blade adapter as claimed in claim 1, wherein the third connection portion extends from the side of the second end of the blade adapter and bends an angle, a gap is defined between the third connection portion and the side of the second end of the blade adapter, a threaded hole is defined in the third connection portion.

3. A hacksaw comprising:
a spine having a first end and a second end, a handle connected to the first end and being perpendicular to the spine, and a reception chamber defined in the second end;
a tension device connected to the handle; and
a blade adapter having a first end and a second end, an engaging portion located at the first end of the blade adapter, a first connection portion located on a top surface of the second end of the blade adapter and having a protrusion extending therefrom, a second connection portion extending from a bottom surface of the second end of the blade adapter and having an inclined surface, a third connection portion located on a side of the second end of the blade adapter and another protrusion extending from the third connection portion, the engaging portion engaged with the reception chamber in the second end of the spine, the handle being parallel to the blade adapter, a frame being formed by the blade adapter, the spine and the handle, a blade having a first end thereof connected to the tension device and a second end of the blade connected to the protrusion of the first connection portion of the blade adapter;
wherein two openings are defined in a side of the blade adapter and located close to the first end of the blade adapter, the engaging portion is located between the two openings.

4. The hacksaw as claimed in claim 3, wherein the third connection portion extends from the side of the second end of the blade adapter and bends an angle, a gap is defined between the third connection portion and the side of the second end of the blade adapter, a threaded hole is defined in the third connection portion.

5. The hacksaw as claimed in claim 3, wherein a jabsaw blade has an end thereof inserted into a gap between an anti-slip surface of the engaging portion and inside of the second end of the spine, the jabsaw blade has a positioning hole and extends from a front end of the hacksaw, a bolt extends through a locking hole defined through the second end of the spine, a threaded hole in the engaging portion and the positioning hole to fix the jabsaw blade to the spine.

6. A hacksaw comprising:
a spine having a first end and a second end, a handle connected to the first end and being perpendicular to the spine, and a reception chamber defined in the second end;
a tension device connected to the handle; and
a blade adapter having a first end and a second end, an engaging portion located at the first end of the blade adapter, a first connection portion located on a top surface of the second end of the blade adapter and having a first protrusion extending therefrom, a second connection portion extending from a bottom surface of the second end of the blade adapter and having an inclined surface, a third connection portion located on a side of the second end of the blade adapter and a third protrusion extending from the third connection portion, the engaging portion engaged with the second end of the spine, and the blade adapter being received in the reception chamber, the second connection portion exposed from the second end of the spine, the third connection portion located on the side of the second end of the blade adapter, a frame being formed by the blade adapter, the spine and the handle, a blade having a first end thereof connected to the tension device and a second end of the blade connected to the third protrusion of the third connection portion of the blade adapter;

wherein two openings are defined in a side of the blade adapter and located close to the first end of the blade adapter, the engaging portion is located between the two openings.

7. The hacksaw as claimed in claim 6, wherein the third connection portion extends from the side of the second end of the blade adapter and bends an angle, a gap is defined between the third connection portion and the side of the second end of the blade adapter, a threaded hole is defined in the third connection portion.

* * * * *